United States Patent
Watanabe

(10) Patent No.: US 8,123,990 B2
(45) Date of Patent: Feb. 28, 2012

(54) METHOD FOR PRODUCING FIBER COMPOSITE

(75) Inventor: Shigeki Watanabe, Kani (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 238 days.

(21) Appl. No.: 12/357,531

(22) Filed: Jan. 22, 2009

(65) Prior Publication Data

US 2009/0242104 A1    Oct. 1, 2009

(30) Foreign Application Priority Data

Jan. 29, 2008  (JP) ................. 2008-018290

(51) Int. Cl.
*B29C 43/02* (2006.01)
*B28B 1/08* (2006.01)

(52) U.S. Cl. ........ 264/45.4; 264/70; 264/45.8; 264/415; 264/442; 264/444

(58) Field of Classification Search .......... 264/442, 264/45.4, 45.8, 70, 415, 444
See application file for complete search history.

(56) References Cited

U.S. PATENT DOCUMENTS

| | | | | |
|---|---|---|---|---|
| 3,286,007 A | * | 11/1966 | Campbell et al. | ............. 264/119 |
| 3,515,569 A | * | 6/1970 | Morehouse et al. | .......... 428/161 |
| 4,362,778 A | | 12/1982 | Andersson et al. | |
| 5,258,089 A | * | 11/1993 | Tanaka et al. | ............... 264/45.4 |
| 5,698,289 A | | 12/1997 | Kolzer | |
| 2004/0026012 A1 | | 2/2004 | Kato et al. | |

FOREIGN PATENT DOCUMENTS

| | | |
|---|---|---|
| AT | 15 989 E | 12/1981 |
| EP | 0 714 755 A1 | 6/1996 |
| JP | 2002-105824 | 4/2002 |

OTHER PUBLICATIONS

German Office Action dated Mar. 22, 2010 that issued with respect to patent family member German Patent Application No. DE 10 2009 003 382.3, along with an English language translation.
English Language Abstract of JP 2002-105824 (Apr. 10, 2002).

* cited by examiner

*Primary Examiner* — Yogendra Gupta
*Assistant Examiner* — Alison Hindenlang
(74) *Attorney, Agent, or Firm* — Greenblum & Bernstein, P.L.C.

(57) ABSTRACT

The object of the present invention is to provide a method for producing a fiber composite excellent in lightweight and rigidity. The present method is one for producing fiber composite having a structure in which reinforcing fibers are bonded with a thermoplastic resin, is characterized in that said reinforcing fiber is at least one of a plant fiber and an inorganic fiber, and comprises a feeding process in which a thermally expandable capsule (20) having a shell wall composed of a thermoplastic resin is fed to one of either front side or back side of a mat (10*a*) comprising the reinforcing fiber and a thermoplastic resin fiber, a dispersing process in which one side of the mat is subjected to vibration from another side of the mat while pressing the one surface side of the mat (10*a*) to disperse the capsule (20) towards another side of the mat, a melting process in which the thermoplastic resin fiber constituting the mat is molten, and an expanding process in which the capsule (20) dispersed in the mat is heated to expand.

14 Claims, 6 Drawing Sheets

METHOD FOR PRODUCING FIBER COMPOSITE

INCORPORATION BY REFERENCE

The disclosure of Japanese Patent Application No. 2008-18290 filed on Jan. 29, 2008 including the specification, drawings and abstract is incorporated herein by reference in its entirety.

BACKGROUND OF THE INVENTION

1. Field of the Invention

The present invention relates to a method for producing a fiber composite, and in detail, to an efficient method for producing a fiber composite having a structure in which reinforcing fibers are bonded with a thermoplastic resin and being excellent in lightweight and rigidity.

2. Related Art

A fiber base material for an automotive door trim is disclosed in Japanese Unexamined Patent Application Publication No. 2002-105824 which is consisting of a natural fiber and a thermoplastic resin, and a formulation ratio thereof is varied in a thickness direction.

Additionally, a fiber base material is known in which a mixture of a natural fiber and a thermoplastic fiber is entangled and compression-molded. This fiber base material is produced, for example, by feeding each fiber onto a transfer conveyor with an aeration device, followed by the process of entanglement, heat-compression and others.

SUMMARY OF THE INVENTION

Demand for weight saving in a component and the like for a vehicle has recently been increased considering an environmental problem. For that purpose, for example, a method for reducing the weight per unit area of the fiber base material is available, but there is still a problem that sufficient rigidity cannot be obtained. There is also such a problem that deep draw molding is difficult in the area with the weight per unit area of a base material being small, for example, 1,500 g/m$^2$ or less.

An object of the present invention is to provide an efficient method for producing a fiber composite which is a fiber material excellent in lightweight and rigidity, by expanding (foaming) a thermally expandable capsule to form and disperse a thermoplastic resin between reinforcing fibers.

The present invention is as follows.
1. A method for producing a fiber composite having a structure in which reinforcing fibers are bonded with a thermoplastic resin, characterized in that the reinforcing fiber is at least one of a plant fiber and an inorganic fiber, and the method comprises:
    a feeding process in which a thermally expandable capsule having a shell wall composed of a thermoplastic resin is fed to one of either front surface or back surface of a mat comprising the reinforcing fiber and a thermoplastic resin fiber,
    a dispersing process in which the mat is subjected to vibration from another side of the mat while pressing the one surface side of the mat to disperse the thermally expandable capsule fed to the one surface side of the mat towards another side of the mat,
    a melting process in which the thermoplastic resin fiber constituting the mat is molten, and
    an expanding process in which the thermally expandable capsule dispersed in the mat is heated to expand.

2. The method for producing a fiber composite according to 1 above, wherein the feeding process is carried out by applying the thermally expandable capsule electrostatically to a surface of the mat.
3. The method for producing a fiber composite according to 1 or 2 above, wherein the dispersing process is carried out by moving the mat with a conveyor,
    wherein the pressing in the dispersing process is carried out by pressing the one surface side of the mat with a roller revolving to advance the mat in a moving direction of the conveyor, and
    wherein the vibration in the dispersing process is carried out from another side of a pressed part in the mat.
4. The method for producing a fiber composite according to 1 to 3 above, wherein the vibration in the dispersing process is applied at an amplitude of 6 mm or less.
5. The method for producing a fiber composite according to 1 to 4 above, wherein the vibration in the dispersing process is applied in a direction with an angle in the range from 30 to 90 degrees relative to the moving direction of the mat.
6. The method for producing a fiber composite according to 1 to 5 above, wherein the melting process and the expanding process are carried out simultaneously.
7. The method for producing a fiber composite according to 1 to 5 above, wherein a melting point of a first thermoplastic resin constituting the thermoplastic resin fiber is lower than a melting point of a second thermoplastic resin constituting the shell wall of the thermally expandable capsule,
    wherein the melting process is carried out by heating the thermally expandable capsule to a temperature of the melting point or higher of the first thermoplastic resin, but not exceeding the melting point of the second thermoplastic resin while applying pressure to control expansion of the thermally expandable capsule, and
    wherein the expanding process is carried out after the melting process.

According to the production method of a fiber composite of the present invention, a fiber composite with light weight and excellent mechanical characteristics can be obtained not only by binding the reinforcing fibers with the thermoplastic resin derived from the thermoplastic resin fiber but also by binding the reinforcing fibers with the thermoplastic resin derived from the shell wall of the thermally expandable capsule thoroughly dispersed between the reinforcing fibers. Furthermore, such a fiber composite can be efficiently obtained without a wet process such as a papermaking method, that is, with a dry process. The fiber composite obtained by the present method allows for deep-draw molding in the area of the weight per unit area at 1,500 g/m$^2$ or less.

In the case where the feeding process is carried out by applying the thermally expandable capsule electrostatically to a surface of the mat, loss of the thermally expandable capsule can be effectively prevented, enabling to produce the fiber composite at lower cost.

In the case where the dispersing process is carried out by moving the mat with a conveyor, the pressing in the dispersing process is carried out by pressing the one surface side of the mat with a roller revolving to advance the mat in a moving direction of the conveyor, and the vibration in the dispersing process is carried out from another side of a pressed part in the mat, the thermally expandable capsule can be well dispersed in the mat in a shorter time.

In the case where the vibration in the dispersing process is applied at an amplitude of 6 mm or less, the thermally expandable capsule can be particularly well dispersed in the mat in a shorter time.

In the case where the vibration in the dispersing process is applied in a direction with an angle in the range from 30 to 90 degrees relative to the moving direction of the mat, the thermally expandable capsule can be particularly well dispersed in the mat in a shorter time.

In the case where the melting process and the expanding process are carried out simultaneously, weight saving of the fiber composite can be attained controlling thickness thereof reliably. Additionally it leads to a reduction of the production and an efficiency.

In the case where a melting point of a first thermoplastic resin constituting the thermoplastic resin fiber is lower than a melting point of a second thermoplastic resin constituting the shell wall of the thermally expandable capsule, the melting process is carried out by heating the thermally expandable capsule to a temperature of the melting point or higher of the first thermoplastic resin, but not exceeding the melting point of the second thermoplastic resin while applying pressure to control expansion of the thermally expandable capsule, and wherein the expanding process is carried out after the melting process, weight saving of the fiber composite can be attained controlling thickness thereof reliably. Additionally it leads to a reduction of the production and an efficiency. Furthermore, this case allows for distributing a fiber composite before expanding containing the highly dispersed thermally expandable capsule which is not expanded between the melting process and the expanding process. Accordingly, its bulkiness can be reduced to ship at a lower cost as compared with a case in which the fiber composite is distributed after expansion.

EXPLANATION OF THE REFERENCE NUMBERS

10a: mat, 10b: thermally expandable capsule-dispersed mat, 10c: fiber composite (fiber composite after expanding), 11: reinforcing fiber, 12: thermoplastic resin fiber, 13: mixed fiber, 20: thermally expandable capsule, 30: thermoplastic resin, d1: one surface side (first surface side), d2: another surface side (second surface side), 101: first web, 102: second web, 103: laminated web, 40: mat production apparatus, 411a: first mixed fiber supplying part, 411b: second mixed fiber supplying part, 412a: first aeration device, 412b: second aeration device, 413: conveying means (conveyor), 414a: first entangling means, 414b: second entangling means, 50: thermally expandable capsule supplying and dispersing apparatus, 51: supplying part, 511: supplying means (electrostatic coating machine), 515: conveyor, 52: dispersing part, 521: pressing means, 522: vibrating means, 525: conveyor, 61: melting means, 62: expanding means, 63: molding means.

DESCRIPTION OF PREFERRED EMBODIMENTS

Hereinafter, the present invention will be described in detail.

1. Production Method of Fiber Composite

The method for producing a fiber composite of the present invention is a method for producing a fiber composite having a structure in which reinforcing fibers are bonded with a thermoplastic resin and the reinforcing fiber is at least one of a plant fiber and an inorganic fiber, and is characterized in that the reinforcing fiber is at least one of a plant fiber and an inorganic fiber, and the method comprises a feeding process in which a thermally expandable capsule having a shell wall composed of a thermoplastic resin is fed to one of either front surface or back surface of a mat comprising the reinforcing fiber and a thermoplastic resin fiber, a dispersing process in which the mat is subjected to vibration from another side of the mat while pressing the one surface side of the mat to disperse the thermally expandable capsule fed to the one surface side of the mat towards another side of the mat, a melting process in which the thermoplastic resin fiber constituting the mat is molten, and an expanding process in which the thermally expandable capsule dispersed in the mat is heated to expand.

Figure 1:
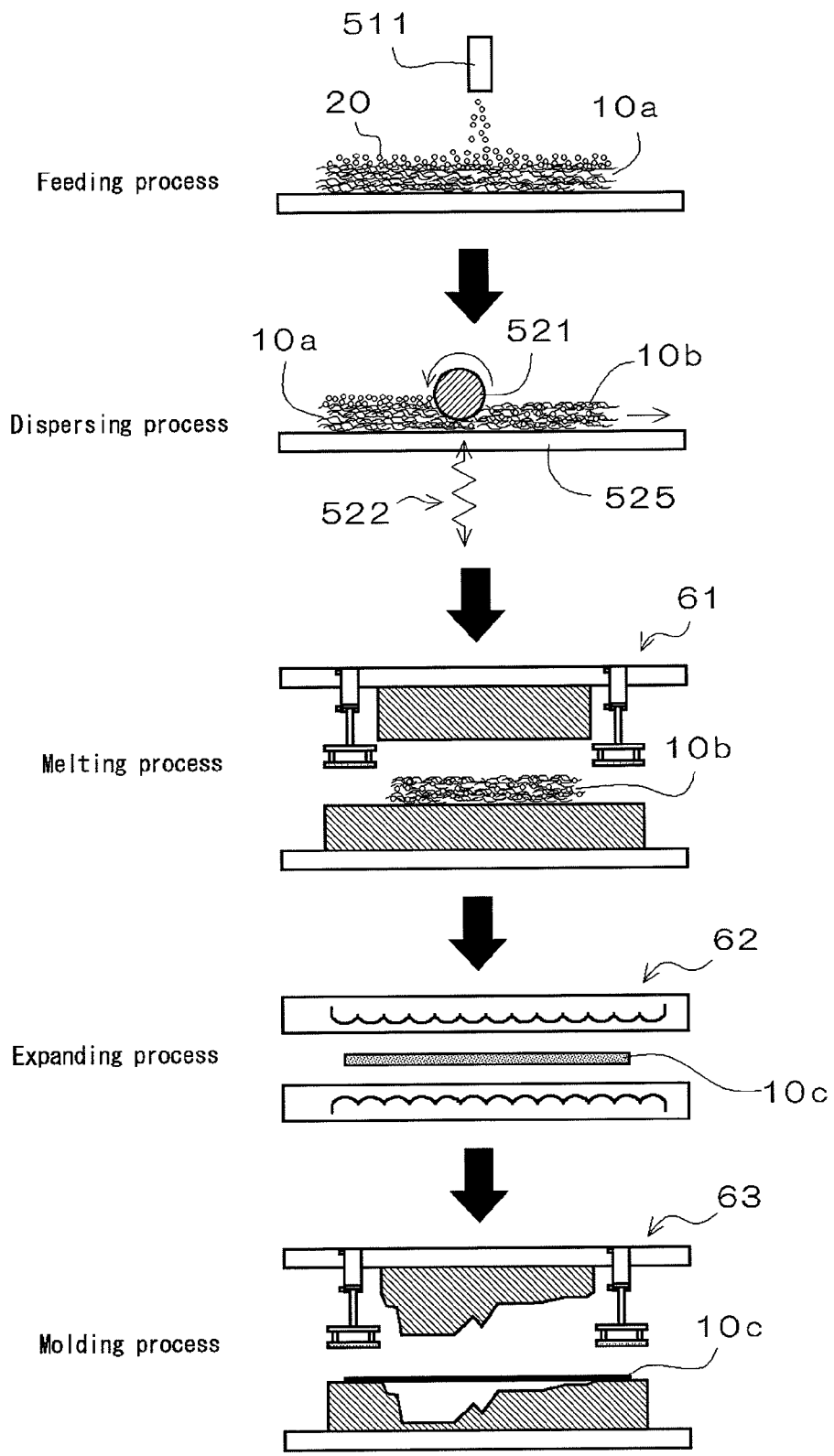
FIG. 1 is a schematic view showing an example of a process flow of the present invention.
Figure 2:
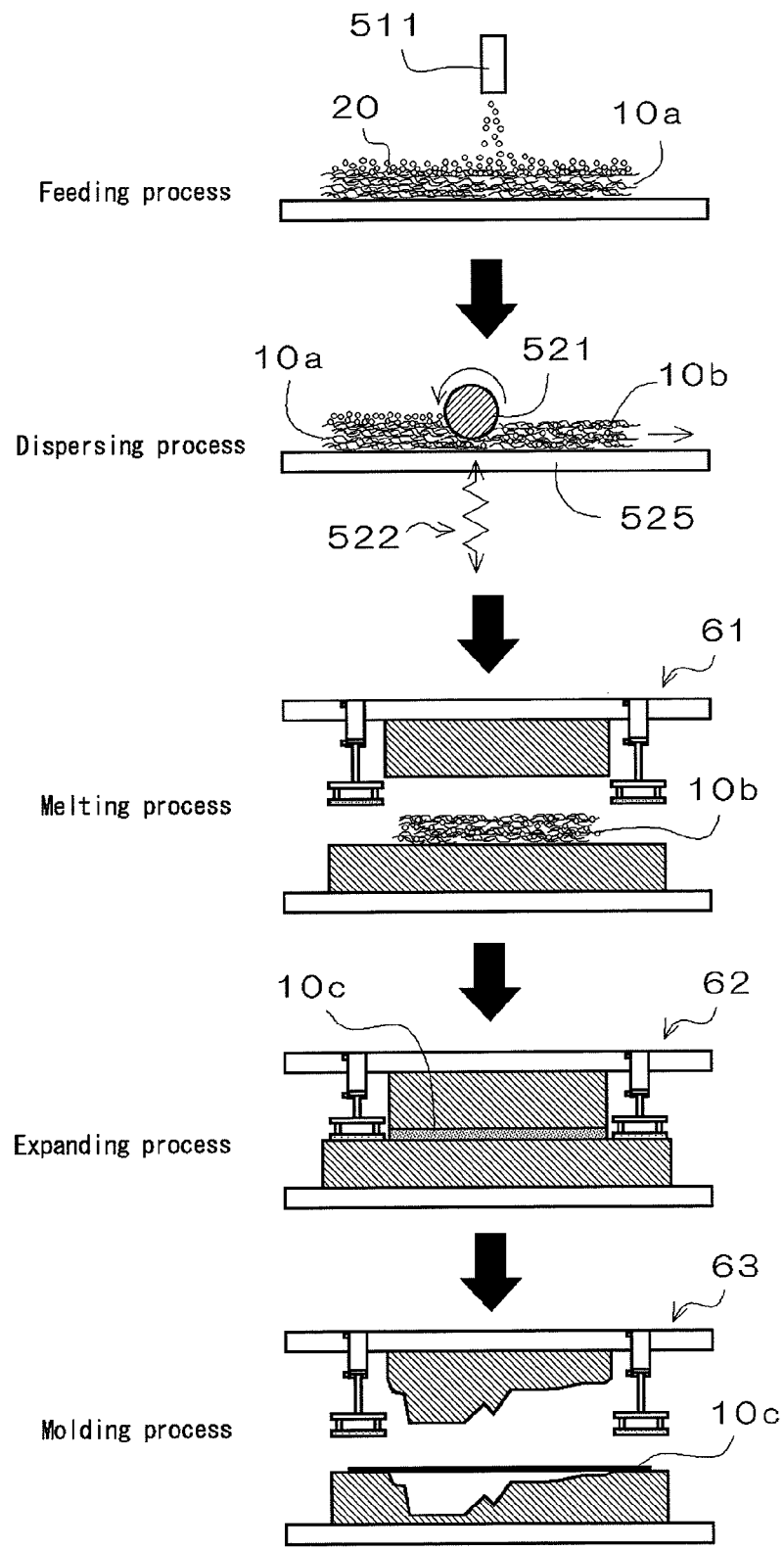
FIG. 2 is a schematic view showing another example of a process flow of the present invention.
Figure 3:
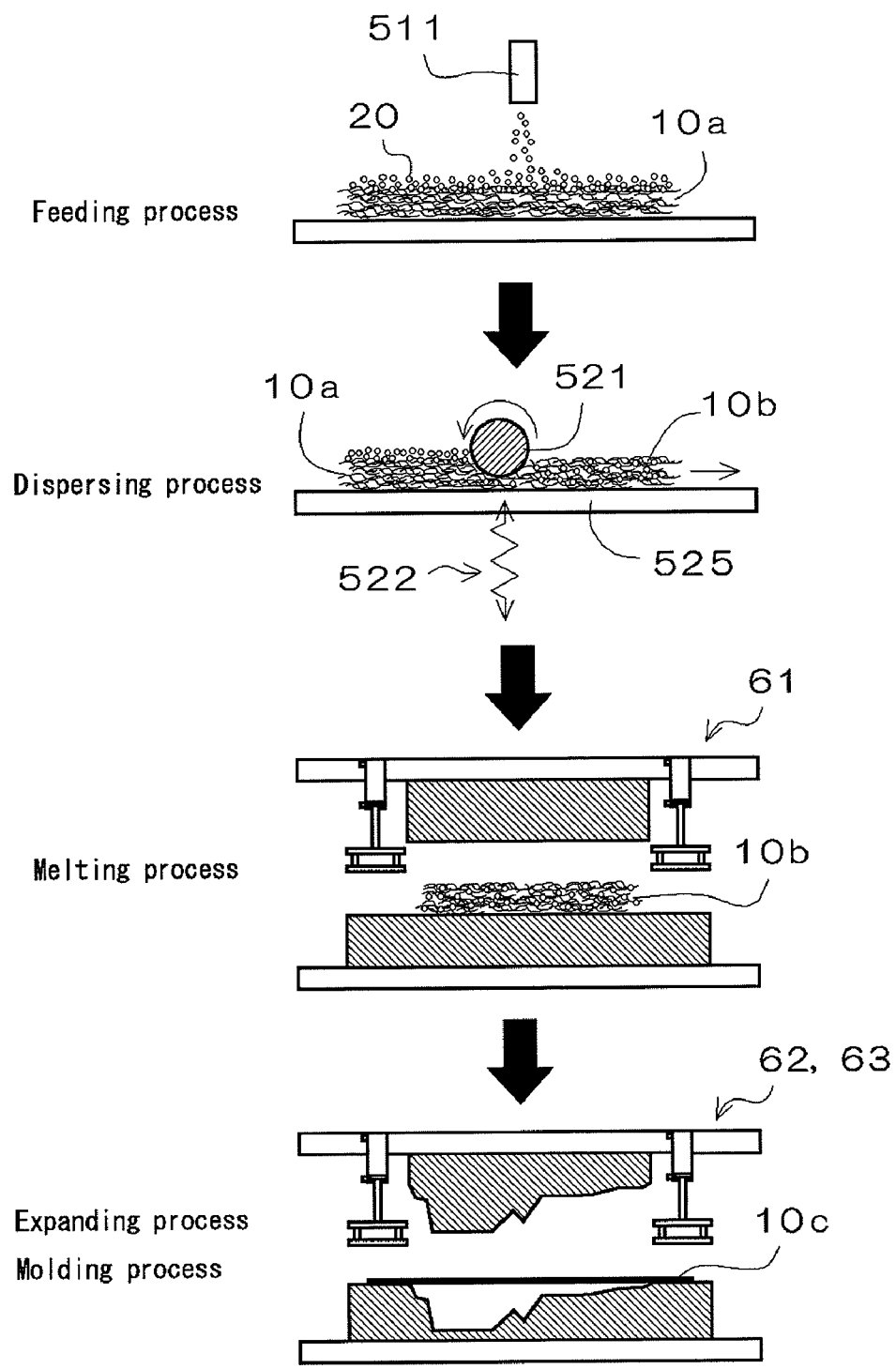
FIG. 3 is a schematic view showing another example of a process flow of the present invention.

The production method of the present invention is provided with the "feeding process", the "dispersing process", the "melting process" and the "expanding process" as shown in FIGS. 1 to 3 and may additionally be provided, for example, with a "molding process". As described afterward in detail, the feeding process and the dispersing process are carried out in this sequence. The melting process and the expanding process are carried out after the dispersing process. In addition, the melting process and the expanding process may be carried out simultaneously or separately.

The above-mentioned "feeding process" is a process in which a thermally expandable capsule having a shell wall composed of a thermoplastic resin is fed to one of either front surface or back surface of a mat comprising the reinforcing fiber and a thermoplastic resin fiber.

The above-mentioned "mat" is a molded body, in which a reinforcing fiber is comingled with a thermoplastic resin fiber in a form of mat (in a form of nonwoven fabric). It is generally obtained by dry fiber-comingling method for a production of a nonwoven fabric. Examples of the fiber-comingling method include aeration method, carding method and the like, but the aeration method is preferred. The aeration method is a method in which the reinforcing fiber and the thermoplastic resin fiber are fed by airflow onto the surface of a conveyor and others to yield a deposit containing the reinforcing fiber and the thermoplastic resin fiber in the sufficient mixing state. In addition, the above-mentioned mat includes the deposit above, a laminated entangled product in which two or more layers of the above-mentioned deposit are laminated and entangled (needling), and a compressed product obtained by compressing these deposits.

The mat used in the present method may be one formed by a wet method such as papermaking method or one by a dry method. The preferred is one by the dry method since a mat by the wet method requires a high level of a drying process. In particular, when the plant fiber is used as the reinforcing fiber, the dry method is especially preferred because the plant fiber has water-absorbing property.

Density, weight per unit area, thickness and others of the mat are not particularly limited and various values can be selected depending on the kinds and the content ratio of the reinforcing fiber. For example, when the reinforcing fiber is a plant fiber, density is generally 0.3 g/m$^3$ or less and generally 0.05 g/m$^3$ or more. The weight per unit area thereof is preferably in the range from 400 to 3,000 g/m$^2$, and more preferably from 600 to 2,000 g/m$^2$. On the other hand, when the reinforcing fiber is a glass fiber, density is generally 0.2 g/cm$^3$ or less and generally 0.03 g/m$^3$ or more. The weight per unit area thereof is preferably in the range from 300 to 1,000 g/m$^2$, and more preferably from 350 to 500 g/m$^2$.

Additionally the thickness of the mat is generally 10 mm or more and generally 50 mm or less. It is preferably in the range from 10 to 30 mm and more preferably from 15 to 40 mm.

It is noted that the density is a value measured according to JIS K7112 (Measurement Method of Density and Specific Gravity of Plastic and Non-foaming Plastic).

The above-mentioned "reinforcing fiber" is a fiber material functioning as a reinforcing material in the fiber composite obtained. A structure formed by bonding such reinforcing fibers with the thermoplastic resin allows for securing the strength of the entire fiber composite. The material of the reinforcing fiber is not particularly limited and examples thereof include a plant fiber and an inorganic fiber.

The above-mentioned "plant fiber" is a fiber derived from a plant and a fiber isolated from the plant, a fiber obtained by providing the fiber isolated from the plant with various treatments, and others are included.

The plant fiber may be a plant fiber including a plant fiber obtained from various kinds of plants such as kenaf, jute hemp, manila hemp, sisal hemp, gampi, Mitsumata, Kozo, banana, pineapple, coconut, corn, sugarcane, bagasse, palm, papyrus, reed grass, esparto, Sabi grass, oat, rice plant, bamboo, various conifer trees (Japanese cedar, Japanese cypress, and others), broad leaf tree, cotton and others. Among these, a fiber derived from kenaf (that is, kenaf fiber as the plant fiber) is preferred. The kenaf is a very fast growing annual grass and has excellent absorbitity of carbon dioxide so that it can contribute to reducing an amount of carbon dioxide in the air, thus effectively utilizing forest resources and others.

The segment of the plant used as the above-mentioned plant fiber is not particularly limited so long as the segment comprises a segment constituting the plant such as woody parts, non-woody parts, leaf parts, stalk section and root parts. Furthermore, only a specific segment thereof may be used or a different segment with two parts or more may be used.

The above-mentioned kenaf is a plant having a woody stem and is classified into malvaceae. The kenaf includes hibiscus cannabinus and hibiscus sabdariffa of scientific names, and further includes Indian hemp, Cuban kenaf, kenaf, roselle, mesta, bimli hemp, ambary hemp, Bombay hemp and the like of common names.

The above-mentioned jute is a fiber obtained from a jute hemp. The jute hemp includes a hemp including ouma (*Corchorus capsularis* L.), Jew's mallow, East Indian mallow, Mulukhiyya and a plant in Tiliacea.

The above-mentioned plant fiber may be used singly or in combination of two or more thereof.

Examples of the above-mentioned "inorganic fiber" includes a glass fiber such as glass wool, a carbon fiber and the like. The inorganic fiber may be used singly or in combination of two or more types thereof.

In addition, only either the plant fiber or the inorganic fiber may be singly used or both the plant fiber and the inorganic fiber may be used in combination. In the present invention, the plant fiber is preferred because of better reinforcing effect and easier handling. Among the inorganic fiber, the glass fiber is preferred. Furthermore, among the plant fiber, the kenaf fiber is especially preferred from an environmental perspective.

The shape and size of the reinforcing fiber is not particularly limited. The fiber length of the reinforcing fiber is preferably 10 mm or more. This fiber length can lead to a resultant fiber composite having higher strength (bending strength, flexural modulus and others, ditto hereinafter). The fiber length is more preferably in the range from 10 to 150 mm, further preferably from 20 to 100 mm, and particularly form 30 to 80 mm.

Additionally, the fiber diameter of the reinforcing fiber is preferably 1 mm or less, more preferably in the range from 0.01 to 1 mm, further preferably from 0.02 to 0.7 mm, particularly from 0.03 to 0.5 mm. A fiber having fiber diameter with the above-mentioned range can lead to a fiber composite having very high strength. The reinforcing fiber may contain a fiber having a fiber length and a fiber diameter deviated from the above-mentioned ranges, but the content of the fiber in the case is preferably 10% by weight or less, and particularly 3% by weight or less relative to a total amount of the reinforcing fiber. This content can keep the high strength of the fiber composite obtained.

The above-mentioned fiber length means an average fiber length (ditto hereinafter) and is an average value for a total of 200 fibers by measuring a fiber length of single fiber with a ruler after randomly pulling out one-by-one in the direct process according to JIS L1015. Furthermore, the above-mentioned fiber diameter means an average fiber diameter (ditto hereinafter) and is a average value for a total of 200 fibers by directly measuring a fiber diameter of single fiber at the center of the fiber in the length direction with an optical microscope after randomly pulling out one-by-one.

The above-mentioned "thermoplastic resin fiber" is contained in the mat in a form of the thermoplastic resin fiber and is a component to be melted in the melting process, enabling to bond the reinforcing fibers.

Examples of the thermoplastic resin constituting the thermoplastic resin fiber include a polyolefin, a polyester resin, polystyrene, an acrylic resin, a polyamide resin, a polycarbonate resin, a polyacetal resin, an ABS resin and the like. Examples of the polyolefin include polypropylene, polyethylene, ethylene propylene random copolymer and the like. Examples of the polyester resin include an aliphatic polyester resin such as polylactic acid, polycaprolactone and polybutylene succinate, an aromatic polyester resin such as polyethylene terephthalate, polytrimethylene terephthalate and polybutylene terephthalate, and the like. The acrylic resin is a resin obtained using a methacrylate and/or an acrylate. The thermoplastic resin may be a modified resin in order to enhance the affinity to the reinforcing fiber (particularly surface of the reinforcing fiber). In addition, the thermoplastic resin may be used singly or in combination of two or more thereof.

Examples of the above-mentioned modified resin include a polyolefin in which the affinity to the reinforcing fiber (material constituting the reinforcing fiber) is enhanced. More specifically, in the case where the reinforcing fiber is a plant fiber, a modified polyolefin with an acid by used of a compound having carboxyl group or derivative thereof (anhydride group and others) is preferred. A combination of a non-modified polyolefin and a maleic anhydride-modified polyolefin is more preferable and a combination of a non-modified polypropylene and a maleic anhydride-modified polypropylene is particularly preferable.

A low molecular weight type polypropylene is also preferred as the maleic anhydride-modified polypropylene. For example, a weight average molecular weight thereof by GPC is preferably in the range from 25,000 to 45,000. Additionally an acid value thereof is preferably in the range from 20 to 60. In the present method, a maleic anhydride-modified polypropylene having a weight average molecular weight from 25,000 to 45,000 and an acid value from 20 to 60 is preferable. Such maleic anhydride-modified polypropylene is particularly preferably used in combination with a non-modified polypropylene. In the case of this combination, the content of the maleic anhydride-modified polypropylene is preferably in the range from 1% to 10% by weight and more preferably from 2% to 6% by weight based on 100% by weight of the maleic anhydride-modified polypropylene and the non-modified polypropylene. This range allows for yielding very high mechanical characteristics.

Among the thermoplastic resins, polyolefin and polyester resin are preferred.

Furthermore, polypropylene is preferred among the above-mentioned polyolefin.

The above-mentioned polyester resin is preferably a polyester resin having biodegradability (hereinafter, referred to as "biodegradable resin"). The biodegradable resin is exemplified as follows.

(1) Hydroxycarboxylic acid based aliphatic polyester such as a homopolymer of a hydroxylcarboxylic acid including lactic acid, malic acid, glucosic acid, 3-hydroxybutyric acid and others, and a copolymer using at least one kind of the hydroxycarboxylic acids.
(2) Caprolactone based aliphatic polyester such as polycaprolactone and a copolymer of at least one kind of the above-mentioned hydroxycarboxylic acids and a caprolactone.
(3) Dibasic acid polyester such as polybutylene succinate, polyethylene succinate and polybutylene adipate.

Among these, polylactic acid, a copolymer of lactic acid with the above-mentioned hydroxycarboxyl acid other than lactic acid, polycaprolactone, and a copolymer of at least one kind of the above-mentioned hydroxylcarboxylic acid with caprolactone are preferred and polylactic acid is particularly preferred. These biodegradable resins may be used singly or in combination of two or more types thereof. It is noted that the above-mentioned lactic acid contains L-lactic acid and D-lactic acid and these lactic acids may be used singly or in combination.

The shape and size of the thermoplastic resin fiber is not particularly limited. The fiber length of the thermoplastic resin fiber is preferably 10 mm or longer. The length can lead to a higher strength (including bending strength, bending elastic modulus and the like, ditto hereinafter) to the resultant fiber composite. This fiber length is more preferably in the range from 10 to 150 mm, further preferably from 20 to 100 mm, and particularly from 30 to 80 mm.

The fiber diameter of the above-mentioned thermoplastic resin fiber is preferably in the range from 0.001 to 1.5 mm, more preferably from 0.005 to 0.7 mm, further preferably from 0.008 to 0.5 mm, and particularly from 0.01 to 0.3 mm. When the fiber diameter is within the range above, the thermoplastic resin fiber is not broken, allowing for entangling with the reinforcing fiber in high dispersity. Above all, such a diameter is especially suitable when the reinforcing fiber is a plant fiber.

A proportion of the reinforcing fiber and the thermoplastic resin fiber constituting the mat is not particularly limited, and the content of the reinforcing fiber is preferably in the range from 10% to 95% by volume, more preferably from 20% to 90% by volume, and further preferably from 30% to 80% by volume based on 100% by volume of the reinforcing fiber and the thermoplastic resin fiber. This range thus facilitates satisfying both excellent lightness in weight and high strength in the present method.

In particular, in the case where the reinforcing fiber is a plant fiber, the content of the plant fiber is preferably in the range from 10% to 95% by weight, more preferably from 20% to 90% by weight, and further preferably from 30% to 80% by weight based on 100% by weight of the plant fiber and the thermoplastic resin fiber.

The mat may contain an additive such as an antioxidant, a plasticizer, an antistatic, a flame retardant, an antimicrobial, a preservative and a colorant in addition to the reinforcing fiber and the thermoplastic resin fiber. The additive may also be contained in the thermoplastic resin fiber.

The above-mentioned "thermally expandable capsule" is a product that has a shell wall (capsule) consisting of a thermoplastic resin and expands its volume by heat. The constitution of the thermally expandable capsule except the shell wall is not particularly limited. The thermally expandable capsule generally contains a expanding agent (expandable component) included within the shell wall. And when the thermally expandable capsule is heated, the thermally expandable capsule initiates expansion of the expanding agent at a specified temperature to further soften the shell wall, resulting in an increase of the volume of the whole capsule.

After expansion, the thermally expandable capsule may burst to convert the shell wall into an infinite form or keep the capsule shape of the shell wall without bursting. Furthermore, when the thermally expandable capsule comprises an expanding agent, the expanding agent may be released to the outside of the shell wall or remain in part or in all within the shell wall after expansion.

The types of the thermoplastic resin constituting the shell wall of the thermally expandable capsule are not particularly limited and may be the same as or different from a thermoplastic resin constituting the above-mentioned thermoplastic resin fiber. The above-mentioned resins can be used as the thermoplastic resin constituting the thermoplastic resin fiber above. In addition to them, a copolymer and homopolymer having a structural unit derived from an unsaturated nitrile compound (hereinafter simply referred to as "acrylonitrile based resin") may be used. Examples of the unsaturated nitrile compound include acrylonitrile, methacrylonitrile and the like. A structural unit other than unit derived from the unsaturated nitrile compound constituting the acrylonitrile based resin is not particularly limited and examples of the compound leading to the unit include an unsaturated acid such as acrylic acid, an ester of an acrylic acid, an ester of a methacrylic acid, an aromatic vinyl compound, an aliphatic vinyl compound, vinyl chloride, vinylidene chloride, a crosslinkable monomer and the like. These compounds may be used singly or in combination of two or more types thereof. The thermoplastic resin constituting the shell wall of the above-mentioned thermally expandable capsule includes a vinylidene chloride-acrylonitrile copolymer.

The above-mentioned expanding agent is a component of expanding the volume on heating. The expanding agent includes a hydrocarbon having low boiling point (in the range from 50° C. to approximately 150° C.). Example thereof includes an aliphatic hydrocarbon such as propane, n-butane, isobutane, n-pentane, isopentane, n-hexane, isohexane and n-octane, an alicyclic hydrocarbon such as cyclopentane, cyclohexane and methylcyclohexane, and a halogenated hydrocarbon such as a chlorinated hydrocarbon including methyl chloride, ethyl chloride and others and a fluorinated hydrocarbon including 1,1,1,2-tetrafluoroethane, 1,1-difluoroethane and others. Among these expanding agents, an aliphatic hydrocarbon with a carbon number of 4 to 10 is particularly preferred. The content of the expanding agent in the thermally expandable capsule is not particularly limited and may be in the range from 5% to 60% by weight, preferably from 10% to 50% by weight, and more preferably from 20% to 30% by weight relative to a total amount of the thermally expandable capsule.

The shape and size of the thermally expandable capsule is not particularly limited. The shape of the thermally expandable capsule is generally spherical. The average particle diameter thereof is preferably in the range from 5 to 100 μm, and more preferably from 10 to 70 μm. When the average particle diameter is within the above-mentioned range, the amount of the thermally expandable capsule to be used can be controlled for sufficiently dispersing in the mat, resulting in more effective weight saving. Accordingly, the resultant fiber composite is excellent in lightweight as well as in rigidity. It is noted that the above-mentioned average particle diameter is D50 value in the particle size distribution obtained by a measurement method of the particle size distribution.

Additionally, the expansion ratio of the thermally expandable capsule (volume after expanding/volume before expanding) is not particularly limited and may be 1.2 to 5 times the volume before expansion.

The softening temperature of the shell wall of the thermally expandable capsule (expanding initiation temperature) is not particularly limited and can be selected depending on the kinds of the thermoplastic resin constituting the shell wall. The softening temperature of the shell wall may be the same as or different from the softening temperature of the thermoplastic resin constituting the thermoplastic resin fiber in the mat. The magnitude of the softening temperature can be selected, for example, depending on the sequence of the process in the present method. For example, when a melting process for melting the thermoplastic resin fiber is carried out at first and an expanding process for expanding the thermally expandable capsule is carried out afterward (hereinafter, referred to as "embodiment (1)"), the softening temperature of the thermoplastic resin constituting the thermoplastic resin fiber is preferably selected to be lower than the softening temperature of the thermoplastic resin constituting the shell wall. On the other hand, when the melting process for melting the thermoplastic resin fiber and the expanding process for expanding the thermally expandable capsule are carried out simultaneously (hereinafter, referred to as "embodiment (2)"), the softening temperature of the thermoplastic resin constituting the thermoplastic resin fiber may be selected to be the same as the softening temperature of the thermoplastic resin constituting the shell wall.

In the case of the embodiment (1), that is, when the melting process and the expanding process are carried out in this sequence, the softening temperature of the shell wall (softening initiation temperature, softening temperature of second thermoplastic resin) is preferably equal to or a higher than the softening temperature of the thermoplastic resin fiber (softening temperature of first thermoplastic resin) by a temperature ranging from 0° C. to +60° C. It is more preferably a higher by a temperature ranging from +10° C. to +40° C. More specifically, when the first thermoplastic resin constituting the thermoplastic resin fiber is a propylene-based polymer such as polypropylene and an ethylene-propylene copolymer, the softening temperature of the first thermoplastic resin is in the range from 140° C. to 170° C. And the softening temperature of the second thermoplastic resin (expanding initiation temperature of thermally expandable capsule) in this case is preferably in the range from 110° C. to 230° C., and more preferably from 140° C. to 210° C. while keeping the above-mentioned temperature difference. In addition, the maximum expanding temperature is preferably in the range from 140° C. to 235° C., and more preferably from 170° C. to 210° C.

On the other hand, in the case of the embodiment (2), that is, when the melting process and the expanding process are carried out simultaneously, the softening temperature of the shell wall (expanding initiation temperature, softening temperature of the second thermoplastic resin) is preferably selected to be in a range of −30° C. to +60° C. based on the softening temperature of the thermoplastic resin fiber (softening temperature of the first thermoplastic resin). It is more preferably a temperature ranging from −10° C. to +40° C. based on the softening temperature of the thermoplastic resin fiber.

The above-mentioned softening temperature is determined according to JIS K7206 "Test Method of Vicat Softening Temperature for Thermoplastic Resin".

In the present method, use of the thermally expandable capsule allows for simultaneously achieving weight saving and enhancement of the strength. The reason is not clear, but can be considered as follows. The thermally expandable capsule is arranged in a gap formed by the reinforced fibers of the mat according to the dispersing process. And when the capsule is heated in the expanding process to expand the expanding agent encapsulated as well as soften the shell wall, leading to expansion into the above-mentioned gap. The extended shell wall is pressed to the reinforcing fiber forming the gap. When the heating temperature is raised to melt the thermoplastic resin constituting the shell wall so that the reinforcing fibers are bound one another in wide area from the inside of the gap. That is, the thermally expandable capsule can bond a plurality of the reinforcing fiber one another in a planar form through the shell wall at once, whereas melting the thermoplastic resin fiber causes bonding at the entangling point with the reinforcing fiber. It is accordingly considered that a small amount of the thermoplastic resin can be efficiently utilized for bonding the reinforcing fiber and a bonding amount of the reinforcing fiber one another is increased to enhance the strength while an amount of the thermoplastic resin contributing to the bonding of the reinforcing fiber is reduced.

In the feeding process, the thermally expandable capsule is fed onto either side of the front or back of the mat. The feeding method is not limited so long as the thermally expandable capsule can be fed onto a surface of the mat. Example thereof includes method (1) in which the thermally expandable capsule may be fed onto a surface of the mat while charging the thermally expandable capsule and the feeding surface of the mat with different polarity by an electrostatic coating method, method (2) in which the thermally expandable capsule is fallen from above to the feeding surface of the mat placed under side, method (3) in which the thermally expandable capsule may be carried with an air flow to attach to the feeding surface of the mat and method (4) that is other method. The methods (1) to (4) may be used singly or in combination.

Among these methods, methods (1) and (2) above are preferred. The method (1) is especially preferred because supply loss can be reduced. When the plant fiber is used as the reinforcing fiber for the mat in particular, the method (1) is preferred. This is because differing from the inorganic fiber, the plant fiber has water content in the range of 10% on an average, enabling to be charged easier and attach the thermally expandable capsule with more certainty.

In the above-mentioned method (1), the thermally expandable capsule before electrostatic coating may be charged in either positive charge or negative charge. In the case where the capsule carries positive charge, negative charge is provided to the mat. It is preferable that the thermally expandable capsule charged by a direct-current voltage is discharged to the feeding surface of the mat grounded to attach by the electrostatic attraction force.

A configuration of an electrostatic coating machine for the electrostatic coating is not particularly limited and an example thereof include an equipment provided with a charging means to charge the thermally expandable capsule and a discharging means to discharge the thermally expandable capsule charged onto the mat, an equipment provided with the discharging means to discharge the thermally expandable capsule that is not charged and the charging means set up outside the above-mentioned discharging means in order to charge the thermally expandable capsule. Among these equipments, only one may be used or both may be used in combination. Examples of the above-mentioned charging means include a corona charging device, a frictional charging device and the like. These devices may be used singly or in combination of two or more thereof.

When the thermally expandable capsule is subjected to application, a discharging amount thereof, an airflow rate onto the mat, a time for coating and others are appropriately adjusted. The airflow rate in electrostatic coating is preferably in the range from 1 to 10 m$^3$/hour, and more preferably in the range from 3 to 6 m$^3$/hour. The airflow rate in the above-mentioned range allows for efficiently retaining the above-mentioned thermally expandable capsule on the mat while reducing the loss thereof, resulting in excellent lightweight and rigidity of the fiber composite.

Examples of the method (2) include a feeding method using a so-called sintering machine, and the like. The sintering machine is a machine having mechanism in which when the thermally expandable capsule is fallen from upward of a roller to the surface embossed by roulette processing or the like, the thermally expandable capsule is caught by the concave portion of the above-mentioned roller surface and fallen by directing the concave portion downwards when the roller is revolved. In this sintering machine, a feeding amount is adjusted by the size and density of the concave portion.

A feeding amount of the thermally expandable capsule in the feeding process is not particularly limited and is appropriately selected according to the object. The feeding amount is generally in the range from 1 to 15 parts by weight based on 100 parts by weight of the mat. The term "feeding amount" herein means an amount of the thermally expandable capsule actually retained by the mat, but not including the amount scattered while fed and the amount transmitted through the mat to fall down or recovered. The feeding amount is preferably in the range from 3 to 12 parts by weight, and more preferably from 5 to 10 parts by weight.

The above-mentioned one surface (hereinafter, referred to as "first surface") side of the mat to be fed the thermally expandable capsule is generally an upper surface provided that the thickness direction of the mat is arranged above and below. That is, the thermally expandable capsule is preferably fed onto the upper surface of the mat. Regardless the method used, this makes feeding of the thermally expandable capsule easy and further prevents the thermally expandable capsule from scattering after feeding so that loss of the thermally expandable capsule can be suppressed.

The above-mentioned "dispersing process" is a process in which the mat is subjected to vibration from another surface (hereinafter, referred to as "second surface") side of the mat while pressing the first surface side of the mat to disperse the thermally expandable capsule fed to the first surface side of the mat towards the second side of the mat. For example, this process is one of dispersing the thermally expandable capsule towards the lower surface side of the mat in the mat, when the thickness direction of the mat is arranged above and below and the thermally expandable capsule is fed onto the upper surface of the mat.

The above-mentioned pressing and vibration can be carried out simultaneously by a vibration roller and others. Since the first surface side of the mat is pressed and the second surface side of the mat is subjected to vibration as described above, efficient dispersion can be performed.

The above-mentioned "pressing" means pressing the above-mentioned first surface side of the mat. Pressing the mat from the first surface side allows for pushing the thermally expandable capsule fed to the first surface side of the mat into the inside of the mat as well as preventing the thermally expandable capsule from poor dispersion caused by the movement of the thermally expandable capsule similar to the mat by vibration.

The method for pressing (pressing method) is not particularly limited so long as the above-mentioned effect can be achieved. Examples of the pressing method include a method for pressing with a roller, a method for pressing by placing a planar plummet on the first surface side, and other method. Among these methods, use of the roller is preferred. The roller can be used in the stream of the production line and is particularly preferred from a perspective of the production process. In addition, when the roller is used, it is considered that the mat is drawn into the roller to be gradually pressed, thereby facilitating to achieve the effect of drawing the thermally expandable capsule into the mat as described above.

When the above-mentioned roller is used, the first surface of the mat can be pressed by a roller revolved so as to advance the mat in the moving direction of the conveyor while moving the mat with the conveyor. The pressing condition with the roller is not particularly limited. Pressing is preferably carried out such that the thickness of the mat just below the roller becomes 5% to 80% of the total thickness of the mat. Preferable range is 10% to 70% and more preferably 20% to 50% based on the total thickness of the mat. When the roller is used according to the above-mentioned range, the effect of pushing the thermally expandable capsule into the inside of the mat and the effect of preventing the mat and the thermally expandable capsule from vibrating together are especially high. In addition, the above-mentioned roller can simultaneously meet the conveying function to convey the mat.

Furthermore, when the roller is used, the number and size of the roller used are not particularly limited. That is, only single roller may be used or two or more may be used. In the case of using two or more rollers are used, each roller with the same size may be used or the roller with a different size may be used in combination. The preferable roller is one having a diameter of at least 1 cm or longer (generally 20 cm or shorter). This is because the function to push the thermally expandable capsule into the mat can be very effectively achieved when the diameter of the roller is 1 cm or more.

Figure 8:
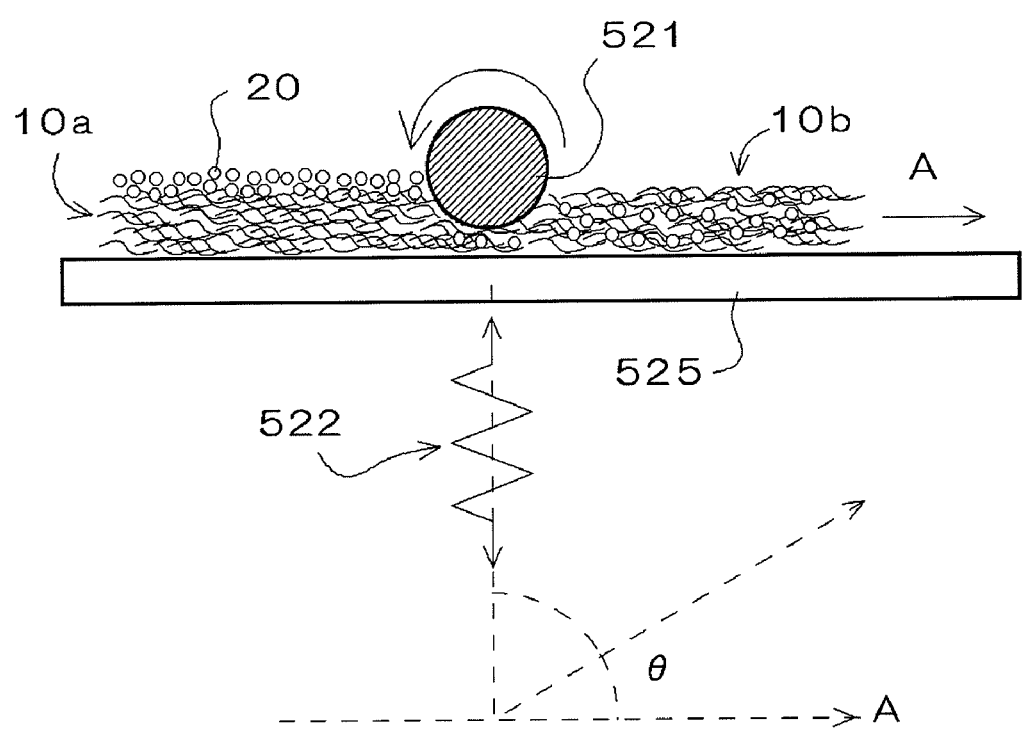
FIG. 8 is an explanatory diagram showing an angle for vibration involved in the present production method.

The above-mentioned "vibrating" is carried out from the second surface side of the mat. The condition for vibrating is not particularly limited and the amplitude for vibrating may be in the range from 0.1 to 20 mm, preferably from 0.1 to 10 mm, more preferably from 0.1 to 6 mm, further preferably from 0.1 to 4 mm, and particularly from 0.5 to 2 mm. The amplitudes in the above-mentioned range particularly facilitate the effect to disperse the thermally expandable capsule. The vibration angle in vibrating (angle $\theta$ in FIG. 8) is not particularly limited and is preferably in the range from 30 to 90 degrees, more preferably from 40 to 90 degrees, and particularly from 45 to 90 degrees relative to the moving direction (A) of the mat (see FIG. 8). It is noted that 90 degrees above means the angle perpendicular to the mat.

An oscillation number (frequency) as other condition for vibrating is not particularly limited and is preferably 500 vpm (8.3 Hz) or more, more preferably 1,000 vpm (16.7 Hz) or more, further preferably 2,000 vpm (33.3 Hz) or more, furthermore preferably 3,000 vpm (50 Hz) or more and particularly 3,500 vpm (58.3 Hz) or more. The oscillation number is generally 60,000 vpm (1,000 Hz) or less. The preferable range can achieve the dispersion effect superior to the case setting the oscillation number smaller than each value. However, when vibration exceeding the above-mentioned upper limit is applied, dispersibility tends to be gradually decreased.

The maximum acceleration during vibration is not particularly limited, but is preferably 3 G or more, more preferably in the range from 5 G to 20 G, further preferably from 7 G to 15 G. This maximum acceleration is generally up to 20 G.

The vibration for the mat is preferably applied against the side opposite to the one pressed. This facilitates achieving the effect of pressing described above. Accordingly, when pressing is carried out by the roller, vibration is preferably applied to the second surface side of the pressed segment in the mat pressed. The presence or absence of the vibration is not inquired for other segments.

Furthermore, a means to apply vibrating is not particularly limited and various equipments can be used. That is, the vibratory equipment for only vibrating may be acceptable, but a feeder to convey the component and others may be used. The feeder may be used an electric feeder or an electromagnetic feeder, and these may be used in combination.

The above-mentioned "melting process" is a process for melting the thermoplastic resin fiber constituting the mat. The above-mentioned "expanding process" is a process for heating and expanding the thermally expandable capsule dispersed in the mat.

These two processes can be carried out in random order. That is, (1) the melting process is first carried out and then the expanding process is carried out, (2) both the melting process and the expanding process are simultaneously carried out, and (3) the expanding process is first carried out and then the melting process is carried out. Among these, the methods (1) and (2) are preferred.

When the method (1) is applied and the melting point of the first thermoplastic resin constituting the thermoplastic resin fiber is lower than the melting point of the second thermoplastic resin constituting the shell wall of the thermally expandable capsule, the mat is heated to a temperature higher than the melting point of the first thermoplastic resin but not exceeding the melting point of the second thermoplastic resin while pressuring the mat to suppress from the expansion of the thermally expandable capsule in the melting process, enabling to yield a molded product (mat, board, and others) formed by bonding the reinforcing fibers with the first thermoplastic resin while keeping the thermally expandable capsule without expansion in the mat. That is, the molded body comprising the thermally expandable capsule dispersed in the gap of the reinforcing fibers bonded by the first thermoplastic resin (hereinafter referred to as "molded body before expanding") can be obtained. The molded body before expanding has a smaller volume as compared with the molded body after expanding in an expanded state so that a transportation cost, a storage cost and the like can be reduced. Furthermore, if the molded body before expanding is subsequently fed to the expanding process, thickness and density can be easier to control as compared with the method (2).

The melting process is a process in which the first thermoplastic resin constituting the thermoplastic resin fiber can be melted and comprises generally heating. The melting process comprises pressing in addition to heating. Pressing allows for further improving the bonding property of the first thermoplastic resin with the reinforcing fiber as well as controlling the thickness of the fiber composite obtained without restriction. When the melting process is first carried out and then the expanding process is carried out as the method (1), expansion of the thermally expandable capsule can be inhibited with more certainty. The heating temperature is selected at an appropriate temperature (at least equal to or above the melting point of the first thermoplastic resin) depending on the kinds of the first thermoplastic resin. Furthermore, in the case of pressing, either heating or pressing may be carried out first or both may be carried out simultaneously. The pressure in pressing may be for example in the range from 1 to 10 MPa, and is preferably from 1 to 5 MPa.

The expanding process is a process in which the thermally expandable capsule can be expanded and the heating condition and others are not particularly limited.

In the expanding process, molding of the fiber composite can also be carried out simultaneously. That is, the thickness and shape can be controlled. For example, after the molded body before expanding is sufficiently expanded in the expanding process, the molded body after expanding can be pressed to compress to the fiber composite with a desired thickness (that is, provided with a molding process). When the temperature of the thermoplastic resin is lowered while appropriately restraining the swelling by using a mold enabling to keep the clearance of a desired thickness for expanding the capsule in the expanding process, the fiber composite having a desired thickness can be obtained. Furthermore, a mold providing a desired bumpy shape allows for yielding the fiber composite having the bumpy shape.

Hereinafter, the melting process, expanding process and molding process in the present method will be described in the sequence of the process using FIGS. 1 to 3.

FIG. 1 schematically illustrates the melting process, expanding process and molding process when the process is carried out as a separate process using separate equipments for each process. In the melting process, a hot press machine is used as a melting means 61 to melt the thermoplastic resin fiber without expanding the thermally expandable capsule while pressing the mat 10b containing the thermally expandable capsule dispersed. According to this melting process, a fiber composite (fiber composite before expanding) is obtained in which the reinforcing fibers are bonded with a thermoplastic resin derived from the thermoplastic resin fiber while containing the dispersed thermally expandable capsule which is not expanded. After that, a furnace such as an oven is used as an expanding means 62 to expand the thermally expandable capsule and obtain a fiber composite after expanding 10c in which the reinforcing fiber is bound by both the thermoplastic resin derived from the thermoplastic resin fiber and the thermoplastic resin derived from the shell wall constituting the thermally expandable capsule. Subsequently, a cold press machine is used as a molding means 63 to mold at the temperature not losing the plasticity of the thermoplastic resin, enabling to yield the molded body consisting of the fiber composite. In addition, when heat is removed to lose the plasticity after the expanding process, reheating can be carried out to provide the shape.

FIG. 2 schematically illustrates a production case, in which the melting process and the expanding process among the melting process, expanding process and molding process are carried out using the same equipment in the same process (continuous process). In the melting process, the hot press machine is used as a melting means 61 to melt the thermoplastic resin fiber without expanding the thermally expandable capsule while applying the pressure on the mat 10b containing the thermally expandable capsule dispersed. After that, the hot press machine used in the melting process 61 is used as it is as an expanding means 62 and takes the core back movement so as to form a desired clearance between the molding dies, expanding the thermally expandable capsule to yield the fiber composite after expanding 10c, in which the reinforcing fiber is bound by both the thermoplastic resin derived from the thermoplastic resin fiber and the thermoplastic resin derived from the shell wall constituting the thermally expandable capsule. Subsequently, a cold press machine is used as a molding means 63 to mold at the temperature not losing the plasticity of the thermoplastic resin, enabling to yield the molded body consisting of the fiber composite. In addition, when heat is removed to lose the plasticity after the expanding process, reheating can be carried out to provide the shape.

FIG. 3 schematically illustrates the production case, in which the expanding process and the molding process among the melting process, expanding process and molding process are carried out using the same equipment in the same process (continuous process). In the melting process, the hot press machine is used as a melting means 61 to melt the thermoplastic resin fiber without expanding the thermally expandable capsule while applying the pressure on the mat 10b containing the thermally expandable capsule dispersed. After that, the thermally expandable capsule-dispersed mat 10b is heated to a range yielding appropriate plasticity as needed (not expanding the thermally expandable capsule) and injected into the hot press machine equipped with a molding die as an expanding means 62 to heat while keeping the desired clearance between the molding dies, expanding the thermally expandable capsule. Subsequently, pressing is followed to enable the formation of the molded body consisting of the fiber composite.

It is noted that while pressure is applied to melt the thermoplastic resin fiber without expanding the thermally expandable capsule in the melting process in FIGS. 1 to 3, melting of the thermoplastic resin fiber and expansion of the thermally expandable capsule can be simultaneously carried out by not applying such a pressure.

The present method can be provided with other process in addition to the feeding process, dispersing process, melting process and expanding process. Example thereof includes a recovering process to recover the thermally expandable capsule by aspirating. When the aspirating process for recovering is provided, the process may be performed in (1) a method which carries out simultaneously with the feeding process, (2) a method which carries out simultaneously with the dispersing process, (3) a method which carries out between the feeding process and the dispersing process, and (4) a method which carries out after the dispersing process. That is, the aspirating process for recovering may be carried out through (1) to (4) or only in the necessary process. When the aspirating process for recovering is provided, the thermally expandable capsule is further effectively prevented from loss, enabling to effectively utilize the thermally expandable capsule.

2. Fiber Composite Obtained by the Present Method

Figure 4:
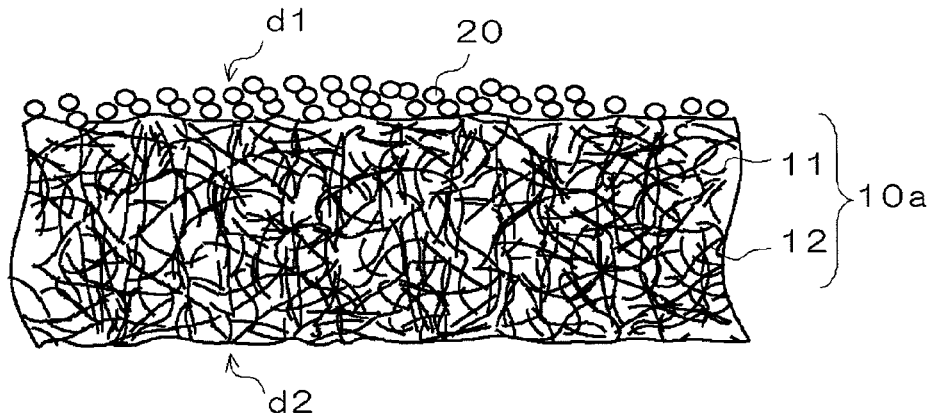
FIG. 4 is a schematic cross-sectional view showing schematically the relation between the mat and the thermally expandable capsule after feeding process in the present production method.
Figure 5:
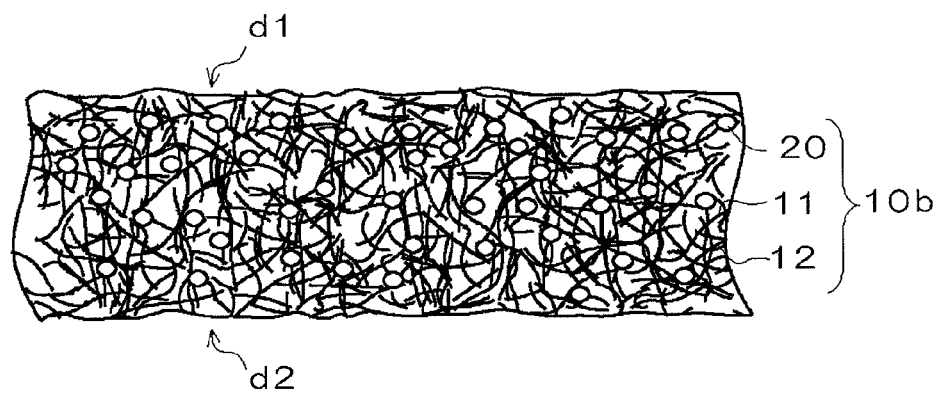
FIG. 5 is a schematic cross-sectional view showing schematically the relation between the mat and the thermally expandable capsule after dispersing process in the present production method.
Figure 6:
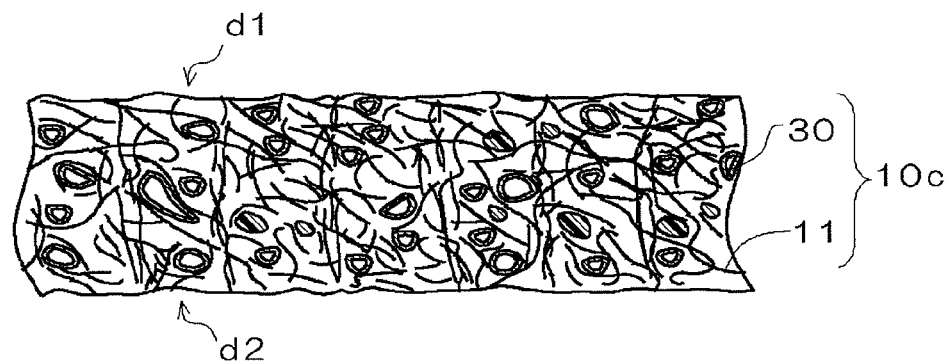
FIG. 6 is a schematic cross-sectional view showing the fiber composite obtained by the present production method.

The fiber composite 10c obtained by the present method comprises the reinforcing fiber 11 and the thermoplastic resin 30 bonding the reinforcing fibers 11 (see FIG. 6). Additionally, the fiber composite 10c is a fiber composite obtained by feeding the thermally expandable capsule 20 to a front surface side (hereinafter referred to as "first surface side") d1 of the mat 10a containing the reinforcing fiber 11 and the thermoplastic resin fiber 12 (feeding process), applying vibration to back surface side (hereinafter referred to as "second surface side") d2 of the mat 10a while pressing the first surface side d1 to disperse the thermally expandable capsule 20 fed onto the first surface side d1 towards the second surface side d2 of the mat 10a (dispersing process), melting the thermoplastic resin fiber 12 constituting the thermally expandable capsule-dispersed mat 10b in which the thermally expandable capsule is dispersed therein (melting process), and followed by heating to expand the thermally expandable capsule 20 dispersed in the thermally expandable capsule-dispersed mat 10b (expanding process), as shown in FIGS. 4 to 6.

The thermoplastic resin 30 constituting the fiber composite 10c comprises the first thermoplastic resin derived from the thermoplastic resin fiber 12 and the second thermoplastic resin derived from the shell wall of the thermally expandable capsule 20. The content ratio of the first thermoplastic resin and the second thermoplastic resin is preferably 30 to 250 parts by weight and 2 to 30 parts by weight, more preferably 50 to 200 parts by weight and 5 to 25 parts by weight, and further preferably 80 to 120 parts by weight and 10 to 20 parts by weight, respectively, provided that the reinforcing fiber is 100 parts by weight. Meeting the above content ratio provides a fiber composite excellent in lightweight and rigidity, allowing for deep-draw molding in the region of the weight of 1,500 g/m$^2$ or less per unit area.

The fiber composite can achieve weight saving by 10% to 60% as compared with a fiber composite not using the thermally expandable capsule from the viewpoint with the same thickness. In addition, the rigidity evaluated by the maximum flexural loading and flexural modulus for the present fiber composite is extremely good as compared with a fiber composite not using the thermally expandable capsule from the viewpoint with the same weight per unit area. For example, in a region of the weight per unit area in the range from 700 to 1,500 g/m$^2$, such higher performance is obtained as the maximum flexural loading is 1.2 to 2 fold and the flexural modulus is 1.1 to 1.6 fold. Use of the fiber composite having the weight per unit area in the range from 750 to 1,000 g/m$^2$ is preferred in the application described later.

The shape, size, thickness and others of the fiber composite obtained by the production method of the present invention are not particularly limited. Its application is also not particularly limited.

The production method of the fiber composite of the present invention is widely used in fields of a vehicle including an automobile, a ship, an aircraft, an architecture and others. The fiber composite can be used as an interior material, an exterior material, a structural material and others of an automobile, a railcar, a ship, an aircraft and others. Among them, examples of an automobile supplies include an interior material for automobile, an instrument panel for automobile, an exterior material for automobile and others. Specific examples are a door base material, a package tray, a pillar garnish, a switch base, a quarter panel, a core material for armrest, a door trim for automobile, sheet-structured material, a sheet backboard, a roof material, a console box, a dashboard for automobile, various instrument panels, a deck trim, a bumper, a spoiler, a cowling and others. Other examples are an interior material, an exterior material and a structural material of an architectural structure, furniture and others. That is, a door surface material, a door structural material, a surface material and a structural material for various furnitures (desk, chain, shelf, chest, and others), and others are included. Additionally a package, a container (tray and others), a member for protection, a member for partition and others may be included.

EXAMPLE

The present invention is specifically described according to the following examples.
1. Production of Fiber Composite

Example 1

(1) Production of Mat Consisting of Thermoplastic Fiber and Reinforcing Fiber

Figure 7:
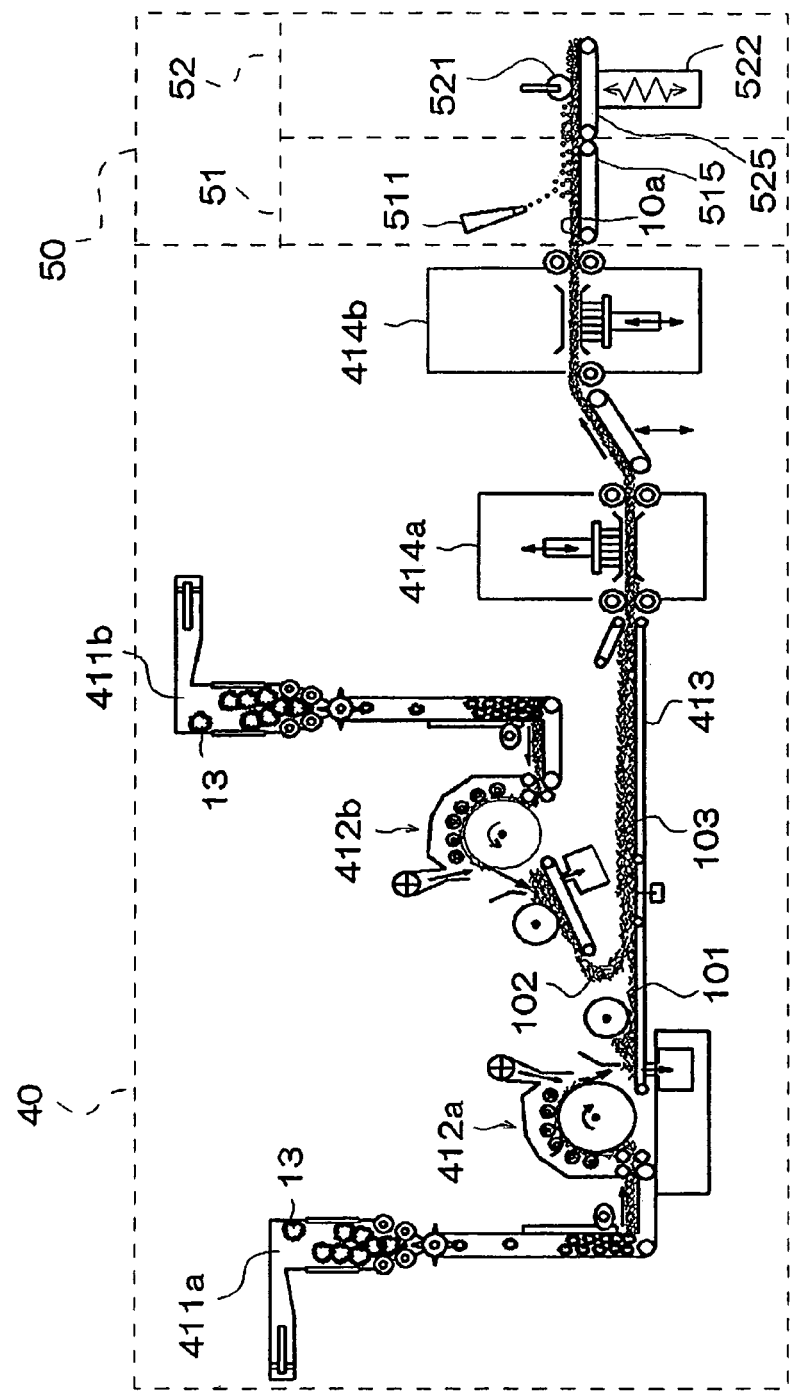
FIG. 7 is an explanatory diagram schematically showing a mat production apparatus and a thermally expandable capsule feeding and dispersing apparatus used in Example 1.

A thermoplastic fiber and a plant fiber (kenaf fiber) as the reinforcing fiber were used to produce a mat 10a consisting of the thermoplastic fiber and the reinforcing fiber with a mat production apparatus 40 shown in FIG. 7. This mat production apparatus 40 is an apparatus that leads to a single layer type mat 10a by subjecting a mixed fiber of the plant fiber and the thermoplastic fiber to two aeration devices of a first aeration device 412a and a second aeration device 412b to produce two webs of a first web 101 and a second web 102, and these webs to lamination, and the laminate to needle punching for entangling the two webs. Furthermore, a thermally expandable capsule feeding and dispersing apparatus 50 is connected with the mat production apparatus 40 at back end in order to feed a thermally expandable capsule to the obtained mat 10a and disperse them in the mat 10a, as shown in FIG. 7.

A kenaf fiber (average diameter: 0.09 mm, average fiber length: 65 mm) was used as the reinforcing fiber 11 and a polypropylene fiber (average diameter: 0.02 mm, average fiber length: 50 mm) manufactured by Daiwabo Co., Ltd. was used as the thermoplastic resin fiber 12. These fibers were mixed by weight ratio of 50:50 to be a mixed fiber 13, which was stored in two storing means of the mat production apparatus 40. The mixed fiber 13 was carried from the two storing means to two mixed fiber feeding parts (first mixed fiber feeding part 411a and second mixed fiber feeding part 411b), respectively. In the case where the stored mixed fiber is massive form, fiber-opened one can be used. After that, the mixed fiber 13 was fed to two aeration devices (first aeration device 412a and second aeration device 412b), from which the mixed fiber was discharged to form first web 101 and second web 102. Subsequently, the first web 101 and second web 102 were laminated on a surface of a conveyor 413 to fabricate a laminated web 103 having thickness of 200 mm. Then the laminated web 103 was subjected to entangling from the upper side of the laminated web by first entangling means (needle punch processing device) 414a and entangling from the lower side of the laminated web by second entangling means (needle punch processing device) 414b to yield the mat 10a consisting of the thermoplastic resin fiber and reinforcing fiber, having thickness of about 20 mm and weight per unit area of 700 g/m².

(2) Feeding Process

The mat 10a obtained in (1) above was conveyed to the thermally expandable capsule feeding and dispersing apparatus 50 that has supplying part (thermally expandable capsule supplying part) 51 and dispersing part 52, and is connected with the mat production apparatus 40. The supplying part 51 has a supplying means that supplies the thermally expandable capsule to the first surface side d1 of the mat 10a, and the dispersing part 52 has a pressing means that press the first surface side d1 of the mat 10a and a vibrating means that gives vibration to the second surface side d2 of the mat 10a. According to the thermally expandable capsule feeding and dispersing apparatus 50, the thermally expandable capsule was fed onto the first surface side d1 of the mat 10a (see FIG. 4), followed by dispersing the thermally expandable capsule 40 in the mat by the dispersing part 52 to yield a thermally expandable capsule-dispersed mat 10b (see FIG. 5). In the present example, an electrostatic coating machine was used as the supplying means 511, and the thermally expandable capsule 20 charged at a high direct-current voltage was sprayed (discharged) to feed and attach by electrostatic attraction force to the first surface side d1 of the mat 10a.

The thermally expandable capsule 20 manufactured by Dainichiseika Color & Chemicals Mfg. Co., Ltd. (product name: "Daifoam H1100D", average particle diameter: 46 µm, expanding initiation temperature: 196° C., maximum expanding temperature: 208° C.) was electrostatically applied to the first surface side d1 of the mat 10a using an electrostatic coating machine manufactured by Ransburg Gema Co., ltd. (product name: "Optiflex 1S (agitation type) handgun unit). As the coating condition, distance from the tip of a gun head to the mat 10a was about 30 cm, the voltage applied to the coating gun was −100 kV, the electric current value was 22 µA, the airflow rate was 4.0 m³/hour, the discharge rate was 40%, the air-rinsing rate was 0.1 m³/hour, and the conveying speed of the conveyor 515 was 3 m/minute.

(3) Dispersing Process

The mat 10a, in which the thermally expandable capsule was fed onto the first surface side d1 in (2) above (in a state of FIG. 4) was thereafter transferred to the dispersing part 52 of the thermally expandable capsule feeding and dispersing apparatus 50 providing to the dispersing process. In this dispersing part 52, a conveyance roller (revolving in the conveyance direction of the mat 10a) with width of 100 cm and diameter of 10 cm, and a Cr plated surface and a conveyor 525 were used as the pressing means 521. This conveyance roller is one revolves while keeping the clearance with the conveyor 525 at 10 mm. The mat 10a was drawn into a gap between this conveyance roller and the conveyor 525, and pressed (equivalent to 1 MPa when reduced to the pressing force) to compress to a thickness of about 50% based on the mat before pressing. An electromagnetic feeder (drive system: electromagnet, number of vibration at 60 Hz of electric source: 3,600 vpm, maximum amplitude: 1.5 mm, maximum trough acceleration: about 12 G) was used as the vibrating means 522.

The pressing means 521 and vibrating means 522 were used while conveying the mat 10a at the conveyance speed of 3 m/minute to obtain a thermally expandable capsule-dispersed mat 10b. That is, pressing of the mat 10a with a conveyance roller as the pressing means 521 and applying vibration with the electromagnetic feeder from the lower side (the second surface side d2) of the pressed part of the mat 10a were performed at the same time to obtain a thermally expandable capsule-dispersed mat 10b in which the thermally expandable capsule 20 was dispersed in the mat 10a. The vibration conditions were as follows: vibration application angle; 45 degrees, amplitude; 1 mm, and number of vibration; 3,600 vpm. It was observed at this time that the thermally expandable capsule attached in the white color to the surface of the mat 10a (first surface side d1 of the mat 10a) was dispersed in the mat by the dispersing process, resulting in disappearance of the white color from the surface of the mat. Additionally, it was confirmed by measuring the weight that the thermally expandable capsule was contained in the mat 10a in an amount of 6 parts by weight relative to 100 parts by weight of the mat 10a (total weight of the thermoplastic resin fiber and the reinforcing fiber).

After that, the thermally expandable capsule-dispersed mat 10b was cut to a specified size with a cutting machine.

(4) Melting Process

The thermally expandable capsule-dispersed mat 10b obtained in (3) above was provided to the melting process with a heat press machine having a flat die therein. The heat pressing was carried out under the condition of a die temperature at 235° C. and a pressure at 24 kgf/cm². After confirming the internal temperature of the thermally expandable capsule-dispersed mat 10b reaching at 210° C., the process was terminated to obtain a fiber composite before expanding having thickness of 2.5 mm. The fiber composite before expanding was in a state where the thermoplastic resin fiber 12 was melted to bond the reinforcing fibers in the composite, but the thermally expandable capsule 20 was not expanded due to pressurization.

(5) Expanding Process and Molding Process

The fiber composite before expanding obtained in (4) above was placed in an oven heated to 235° C. to expand the thermally expandable capsule 20 for a fiber composite after expanding 10c (See FIG. 6). At this time, it was confirmed that the internal temperature of the fiber composite before expanding was reached to 210° C. (temperature exceeding the maximum expanding temperature of thermally expandable capsule 20 at 208° C.).

After that, the fiber composite after expanding 10c was transferred promptly to a cold press machine before losing the plasticity. The die temperature of the cold press machine was adjusted to 40° C. The fiber composite after expanding 10c was pressurized using the cold press machine at a surface pressure of 36 kgf/cm² for 60 seconds to yield a flat plate-like fiber composite 10c having a thickness of 4 mm, weight per unit area of 1,000 g/m² and density of 0.28 g/cm³.

2. Production of Fiber Composite

Example 2

A fiber composite having thickness of 4 mm, weight per unit area of 1,000 g/m² and density of 0.25 g/cm³ was obtained under all conditions similar to Example 1 except an acid-modified polypropylene fiber (average diameter: 0.025 mm, average fiber length: 51 mm), in which polypropylene (product name: "NOVATEC SA91" manufactured by Japan Polypropylene Corporation) and maleic anhydride-modified polypropylene (product name: "Yumex 1001" manufactured by Sanyo Chemical Industries, Ltd.) were mixed in the proportion of 97:3 by weight to convert to the fiber (by melt spinning method) was used instead of the polypropylene fiber in Example 1.

3. Production of Comparative Product

Comparative Example 1

A fiber composite having thickness of 4 mm, weight per unit area of 1,000 g/m² and density of 0.27 g/cm³ was obtained under all conditions similar to Example 1 except no thermally expandable capsule 20 was used.

4. Comparison of Mechanical Properties of Fiber Composites in Example 1, Example 2 and Comparative Example 1.

The maximum flexural loading, bending strength and flexural modulus were measured according to JIS K7171. A test specimen (length: 150 mm, width: 50 mm, and thickness: 4 mm), in which the water content was adjusted to approximately 10% was used for the measurement. A load was applied at the rate of 50 mm/minute from the point of action (curvature radius: 3.2 mm) arranged at the center between the point of support while supporting the test specimen between two supporting points (curvature radius: 5.0 mm) apart 100 mm as the distance between the supporting points (L), measuring each characteristics. The results are as follows.

| "Maximum flexural loading" | |
|---|---|
| Example 1 | 38.02 N |
| Example 2 | 47.57 N |
| Comparative Example 1 | 21.14 N |
| "Bending strength" | |
| Example 1 | 8.26 MPa |
| Example 2 | 10.33 MPa |
| Comparative Example 1 | 4.08 MPa |
| "Flexural Modulus" | |
| Example 1 | 971.87 MPa |
| Example 2 | 980.60 MPa |
| Comparative Example 1 | 472.53 MPa |

It was found from the results above, that significantly improved mechanical properties were obtained in Example 1 relative to Comparative Example 1, in which the fiber composite of Example 1 using the thermally expandable capsule was 1.80 times (80% improvement) of the maximum flexural loading, 2.02 times (102% improvement) concerning the bending strength and 2.06 times (106% improvement) of the flexural modulus relative to the fiber composite of Comparative Example 1 using no thermally expandable capsule even though both have the same weight per unit area as described above. In addition, even better mechanical properties were obtained in Example 2 relative to Comparative Example 1, in which the maximum flexural loading was 2.25 times (125% improvement), the bending strength was 2.53 times (153% improvement), and the flexural modulus was 2.07 times (107% improvement).

These results mean the weight per unit area in Example 1 can be reduced up to approximately 600 g/m² in order to achieve the maximum flexural loading, bending strength, and flexural modulus equivalent to those in Comparative Example 1. This also means the weight per unit area in Example 2 can be reduced up to approximately 500 g/m² in order to achieve the maximum flexural loading, bending strength, and flexural modulus equivalent to those in Comparative Example 1. According, it can be understood that extreme weight saving can be achieved with the fiber composite obtained using the present method compared with the fiber composite described in the conventional method.

5. Effect by Difference of Each Means in Dispersing Process (1) Effect by Difference of Pressing Means In the dispersing process (3) of Example 1, the conveyance roller was used as the pressing means. So, a dispersing process was similarly performed except using an approximately square-shaped plummet with weight of 10 kg and thickness of 1 cm as the pressing means instead of this roller. As the result, similar physical properties were retained, but this system was inferior to the case using the conveyance roller in workability after considering rate-controlling nature and mass productivity.

(2) Effect by Difference of Vibration Condition

In the dispersing process (3) of Example 1, the vibration condition was set as 45 degrees for the vibration application angle, 1 mm for the amplitude, and 3,600 vpm for the number of vibration. So, the vibration condition was varied to compare its effect. As the result, it was found that the vibration condition in Test 1 was excellent as shown below.

| | Test 1 | |
|---|---|---|
| Vibration condition: | vibration application angle; | 45 degrees |
| | amplitude; | 1 mm |
| | oscillation number; | 3,600 vpm |
| Dispersibility: | The white color state on the mat surface became invisible within 10 seconds, enabling very efficient dispersion. | |
| | Test 2 | |
| Vibration condition: | vibration application angle; | 30 degrees |
| | amplitude; | 6 mm |
| | oscillation number; | 900 vpm |
| Dispersibility: | The white color state on the mat surface became invisible after exceeding 10 seconds, indicating the dispersion is possible while being inferior to the condition of Test 1. | |
| | Test 3 | |
| Vibration condition: | vibration application angle; | 40 degrees |
| | amplitude; | 2 mm |
| | oscillation number; | 3,000 vpm |
| Dispersibility: | The white color state on the mat surface became invisible after exceeding 10 seconds, indicating the dispersion is possible while being inferior to the condition of Test 1. | |

What is claimed is:

1. A method for producing a fiber composite having a structure in which reinforcing fibers are bonded with a thermoplastic resin, characterized in that said reinforcing fiber is at least one of a plant fiber and an inorganic fiber, and said method comprises:
    a feeding process in which a thermally expandable capsule having a shell wall composed of a thermoplastic resin is fed to one of either front surface or back surface of a mat comprising said reinforcing fiber and a thermoplastic resin fiber,
    a dispersing process in which said mat is subjected to vibration from another side of said mat while pressing said one surface side of said mat with a roller to disperse said thermally expandable capsule fed to said one surface side of said mat towards said another side of said mat,
    a melting process in which said thermoplastic resin fiber constituting said mat is molten, and
    an expanding process in which said thermally expandable capsule dispersed in said mat is heated to expand.

2. The method for producing a fiber composite according to claim 1, wherein said feeding process is carried out by applying said thermally expandable capsule electrostatically to a surface of said mat.

3. The method for producing a fiber composite according to claim 2, wherein said dispersing process is carried out by moving said mat with a conveyor,
    wherein said pressing in said dispersing process is carried out by pressing said one surface side of said mat with said roller revolving to advance said mat in a moving direction of said conveyor, and
    wherein said vibration in said dispersing process is carried out from said another side of a pressed part in said mat.

4. The method for producing a fiber composite according to claim 3, wherein said vibration in said dispersing process is applied at an amplitude of 6 mm or less.

5. The method for producing a fiber composite according to claim 4, wherein said vibration in said dispersing process is applied in a direction with an angle in the range from 30 to 90 degrees relative to the moving direction of said mat.

6. The method for producing a fiber composite according to claim 5, wherein said melting process and said expanding process are carried out simultaneously.

7. The method for producing a fiber composite according to claim 5, wherein a melting point of a first thermoplastic resin constituting said thermoplastic resin fiber is lower than a melting point of a second thermoplastic resin constituting said shell wall of said thermally expandable capsule,
    wherein said melting process is carried out by heating said thermally expandable capsule to a temperature of said melting point or higher of said first thermoplastic resin, but not exceeding said melting point of said second thermoplastic resin while applying pressure to control expansion of said thermally expandable capsule, and
    wherein said expanding process is carried out after said melting process.

8. The method for producing a fiber composite according to claim 1, wherein said dispersing process is carried out by moving said mat with a conveyor,
    wherein said pressing in said dispersing process is carried out by pressing said one surface side of said mat with said roller revolving to advance said mat in a moving direction of said conveyor, and
    wherein said vibration in said dispersing process is carried out from said another side of a pressed part in said mat.

9. The method for producing a fiber composite according to claim 8, wherein said vibration in said dispersing process is applied at an amplitude of 6 mm or less.

10. The method for producing a fiber composite according to claim 9, wherein said vibration in said dispersing process is applied in a direction with an angle in the range from 30 to 90 degrees relative to the moving direction of said mat.

11. The method for producing a fiber composite according to claim 10, wherein said melting process and said expanding process are carried out simultaneously.

12. The method for producing a fiber composite according to claim 10, wherein a melting point of a first thermoplastic resin constituting said thermoplastic resin fiber is lower than a melting point of a second thermoplastic resin constituting said shell wall of said thermally expandable capsule,
    wherein said melting process is carried out by heating said thermally expandable capsule to a temperature of said melting point or higher of said first thermoplastic resin, but not exceeding said melting point of said second thermoplastic resin while applying pressure to control expansion of said thermally expandable capsule, and
    wherein said expanding process is carried out after said melting process.

13. The method for producing a fiber composite according to claim 1, wherein said melting process and said expanding process are carried out simultaneously.

14. The method for producing a fiber composite according to claim 1, wherein a melting point of a first thermoplastic resin constituting said thermoplastic resin fiber is lower than a melting point of a second thermoplastic resin constituting said shell wall of said thermally expandable capsule,
    wherein said melting process is carried out by heating said thermally expandable capsule to a temperature of said melting point or higher of said first thermoplastic resin, but not exceeding said melting point of said second thermoplastic resin while applying pressure to control expansion of said thermally expandable capsule, and
    wherein said expanding process is carried out after said melting process.

* * * * *